US012689158B2

(12) United States Patent
Hung et al.

(10) Patent No.: US 12,689,158 B2
(45) Date of Patent: Jul. 21, 2026

(54) ELECTRICAL CONNECTOR WITH GRADUAL PLUGGING FEEL

(71) Applicant: DONGGUAN LUXSHARE TECHNOLOGIES CO., LTD, Dongguan City (CN)

(72) Inventors: Yungchih Hung, Dongguan City (CN); Rongzhe Guo, Dongguan City (CN)

(73) Assignee: DONGGUAN LUXSHARE TECHNOLOGIES CO., LTD, Dongguan City (CN)

(*) Notice: Subject to any disclaimer, the term of this patent is extended or adjusted under 35 U.S.C. 154(b) by 444 days.

(21) Appl. No.: 18/224,800

(22) Filed: Jul. 21, 2023

(65) Prior Publication Data

US 2024/0178619 A1 May 30, 2024

(30) Foreign Application Priority Data

Nov. 29, 2022 (CN) ......................... 202211505836.8

(51) Int. Cl.

*H01R 13/641* (2006.01)
*H01R 12/72* (2011.01)
*H01R 12/73* (2011.01)
*H01R 13/24* (2006.01)

(52) U.S. Cl.

CPC ......... *H01R 13/641* (2013.01); *H01R 12/721* (2013.01); *H01R 12/73* (2013.01); *H01R 13/2442* (2013.01)

(58) Field of Classification Search

None

See application file for complete search history.

(56) References Cited

U.S. PATENT DOCUMENTS

| | | | | |
|---|---|---|---|---|
| 6,309,254 | B1 * | 10/2001 | Korsunsky | H01R 13/6461 439/60 |
| 2014/0294349 | A1 * | 10/2014 | Nishio | G02B 6/4284 385/77 |
| 2020/0303851 | A1 * | 9/2020 | Hsu | H01R 13/2442 |
| 2021/0408703 | A1 | 12/2021 | Hung | |
| 2022/0131297 | A1 | 4/2022 | Lin et al. | |
| 2024/0347953 | A1 * | 10/2024 | Yi | H01R 13/6272 |

FOREIGN PATENT DOCUMENTS

| | | | |
|---|---|---|---|
| CN | 201323349 | Y | 10/2009 |
| CN | 201478560 | U | 5/2010 |
| CN | 108110454 | A | 6/2018 |
| CN | 215184610 | U | 12/2021 |
| CN | 114256660 | A | 3/2022 |

* cited by examiner

*Primary Examiner* — Oscar C Jimenez

(74) *Attorney, Agent, or Firm* — Birch, Stewart, Kolasch & Birch, LLP

(57) ABSTRACT

An electrical connector includes an insulating body and a first power terminal module. The insulating body includes a first mating slot for receiving a mating module. The first power terminal module includes a first power terminal and a second power terminal. The first power terminal includes a first elastic arm. The second power terminal includes a second elastic arm. The second elastic arm is provided with a first raised portion. When the mating module is inserted into the first mating slot and inserted in place, the first raised portion is deformed to be in contact with the first power terminal.

20 Claims, 18 Drawing Sheets

ELECTRICAL CONNECTOR WITH GRADUAL PLUGGING FEEL

CROSS-REFERENCE TO RELATED APPLICATION

This patent application claims priority of a Chinese Patent Application No. 202211505836.8, filed on Nov. 29, 2022 and titled "ELECTRICAL CONNECTOR", the entire content of which is incorporated herein by reference.

TECHNICAL FIELD

The present disclosure relates to an electrical connector, in particular to a card edge connector for insertion of an electronic card, which belongs to the technical field of connectors.

BACKGROUND

An electrical connector in the related art usually includes an insulating body and a plurality of conductive terminals. When the electrical connector is used to transmit power, the conductive terminals include power terminals. The insulating body defines a mating slot. The power terminal includes a mating elastic arm extending into the mating slot.

How to optimize the design of the mating elastic arm to provide a gradual plugging feel is a technical problem to be solved by those skilled in the art.

SUMMARY

An object of the present disclosure is to provide an electrical connector with gradual plugging feel.

In order to achieve the above object, the present disclosure adopts the following technical solution: an electrical connector, including: an insulating body including a first mating surface and a first mating slot extending through the first mating surface, the first mating slot being configured to receive a mating module; and a first power terminal module fixed to the insulating body, the first power terminal module including a first power terminal and a second power terminal, the first power terminal including a first main body portion, a first elastic arm extending from the first main body portion, and a first tail portion extending from the first main body portion; the first elastic arm including a first mating portion extending into the first mating slot; the second power terminal including a second main body portion, a second elastic arm extending from the second main body portion, and a second tail portion extending from the second main body portion; the second elastic arm including a second mating portion extending into the first mating slot; the first main body portion and the second main body portion being arranged at intervals along a first direction; the first mating portion and the second mating portion being arranged at intervals along a second direction perpendicular to the first direction; wherein the second elastic arm is provided with a first raised portion protruding toward the first power terminal along the first direction; when the mating module is not inserted into the first mating slot, a first gap is formed between the first raised portion and the first power terminal in the first direction, so that the first raised portion is not in contact with the first power terminal; and when the mating module is inserted into the first mating slot and inserted in place, the second elastic arm is deformed toward the first power terminal by being abutted by the mating module, so that the first raised portion is in contact with the first power terminal in the first direction.

In order to achieve the above object, the present disclosure adopts the following technical solution: a card edge connector configured to receive an electronic card, including: an insulating body including a first mating surface and a first mating slot extending through the first mating surface, the first mating slot being configured to receive the electronic card; and a first power terminal module including a first power terminal and a second power terminal, the first power terminal including a first main body portion, a first elastic arm and a first tail portion; the first elastic arm including a first mating portion extending into the first mating slot; the second power terminal including a second main body portion, a second elastic arm and a second tail portion; the second elastic arm including a second mating portion extending into the first mating slot; the first main body portion and the second main body portion being arranged at intervals along a first direction; the first mating portion and the second mating portion being arranged at intervals along a second direction perpendicular to the first direction; wherein the second elastic arm is provided with a first raised portion protruding toward the first power terminal; when the electronic card is not inserted into the first mating slot, a first gap is formed between the first raised portion and the first power terminal in the first direction, so that the first raised portion is not in contact with the first power terminal; and when the electronic card is inserted into the first mating slot and inserted in place, the second elastic arm is driven by the electronic card, so that the first raised portion is in contact with the first power terminal in the first direction.

Compared with the prior art, the second elastic arm of the present disclosure is provided with the first raised portion protruding toward the first power terminal along the first direction. When the mating module is not inserted into the first mating slot, there is a first gap between the first raised portion and the first power terminal in the first direction. Therefore, the first raised portion is not in contact with the first power terminal, so that a relatively weak plugging feel is produced. When the mating module is inserted into the first mating slot and inserted in place, the second elastic arm is abutted by the mating module and deformed toward the first power terminal. As a result, the first raised portion is in contact with the first power terminal in the first direction, thereby generating a relatively strong plugging feel. At the same time, through the abutment of the first raised portion on the first power terminal, the first power terminal and the second power terminal are connected in series, which facilitates the transmission of a relatively large current.

DETAILED DESCRIPTION

Figure 1:
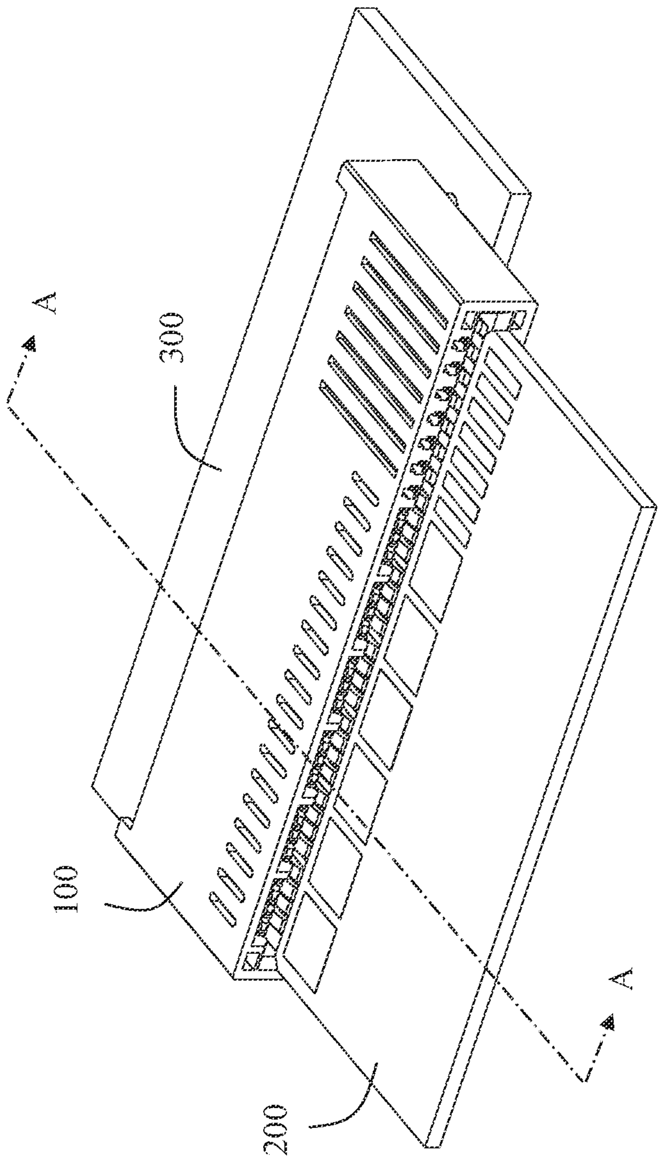
FIG. 1 is a partial perspective view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 4, the present disclosure discloses an electrical connector 100 for being mounted to a circuit board 300 and for mating with a mating module 200. The electrical connector 100 includes an insulating body 1, a plurality of first power terminal modules 2 fixed to the insulating body 1, a plurality of second power terminal modules 3 fixed to the insulating body 1, and a plurality of conductive terminals 4 fixed to the insulating body 1.

Figure 2:
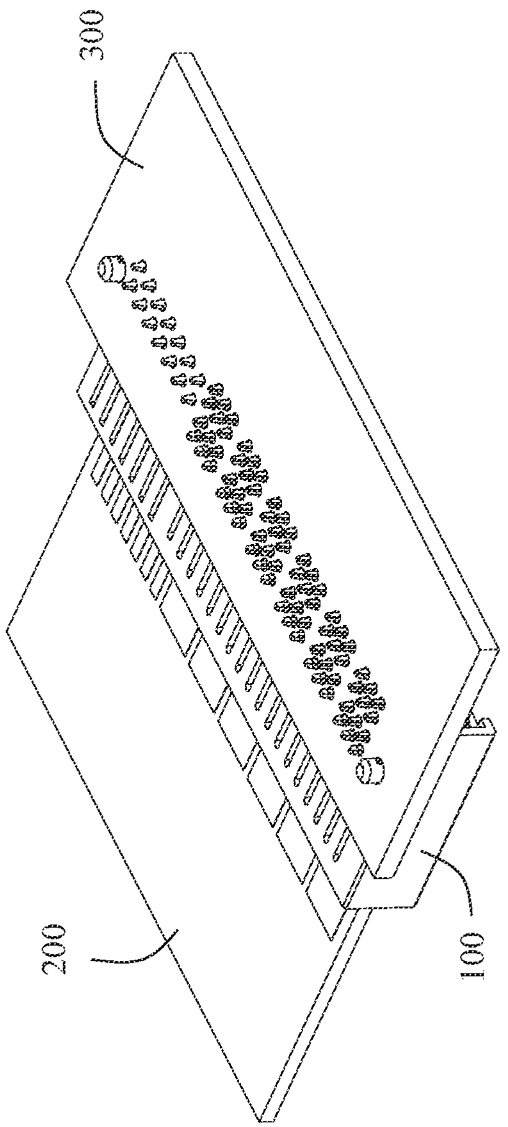
FIG. 2 is a partial perspective view of FIG. 1 from another angle.
Figure 3:
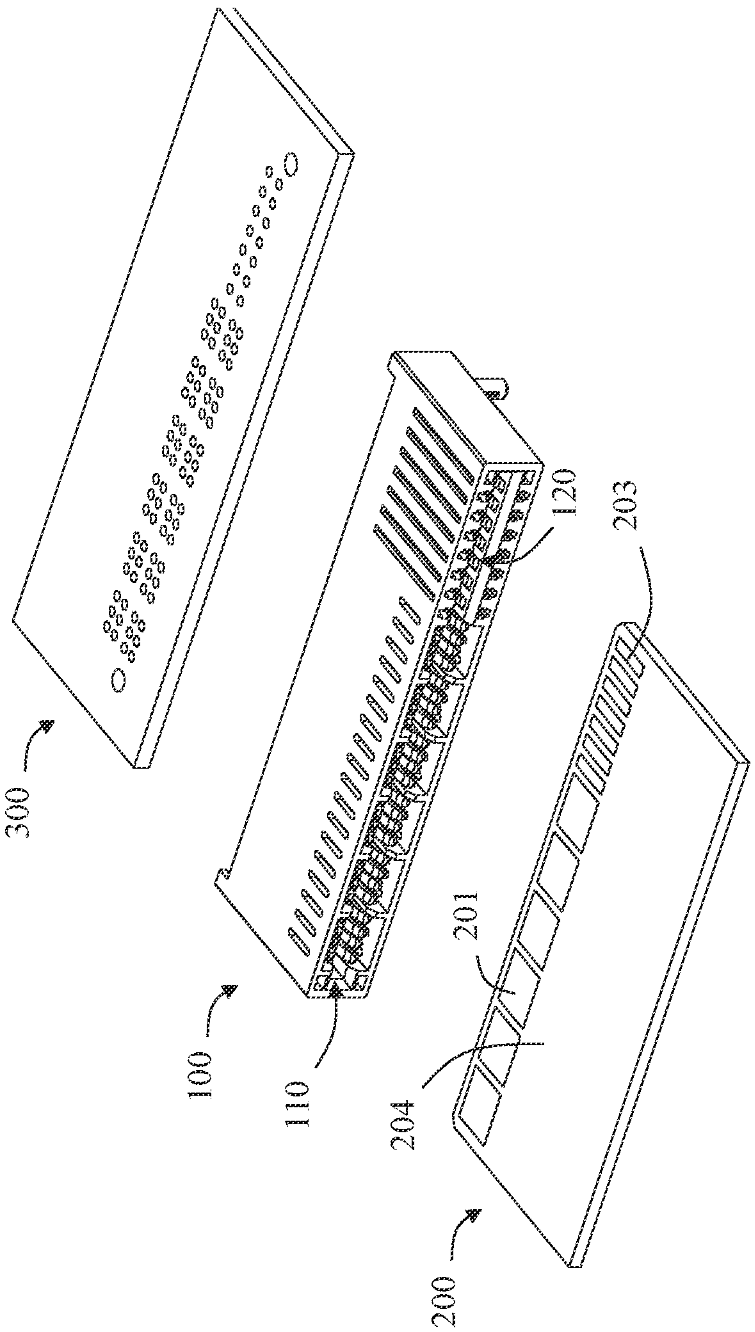
FIG. 3 is a partial perspective exploded view of FIG. 1.
Figure 4:
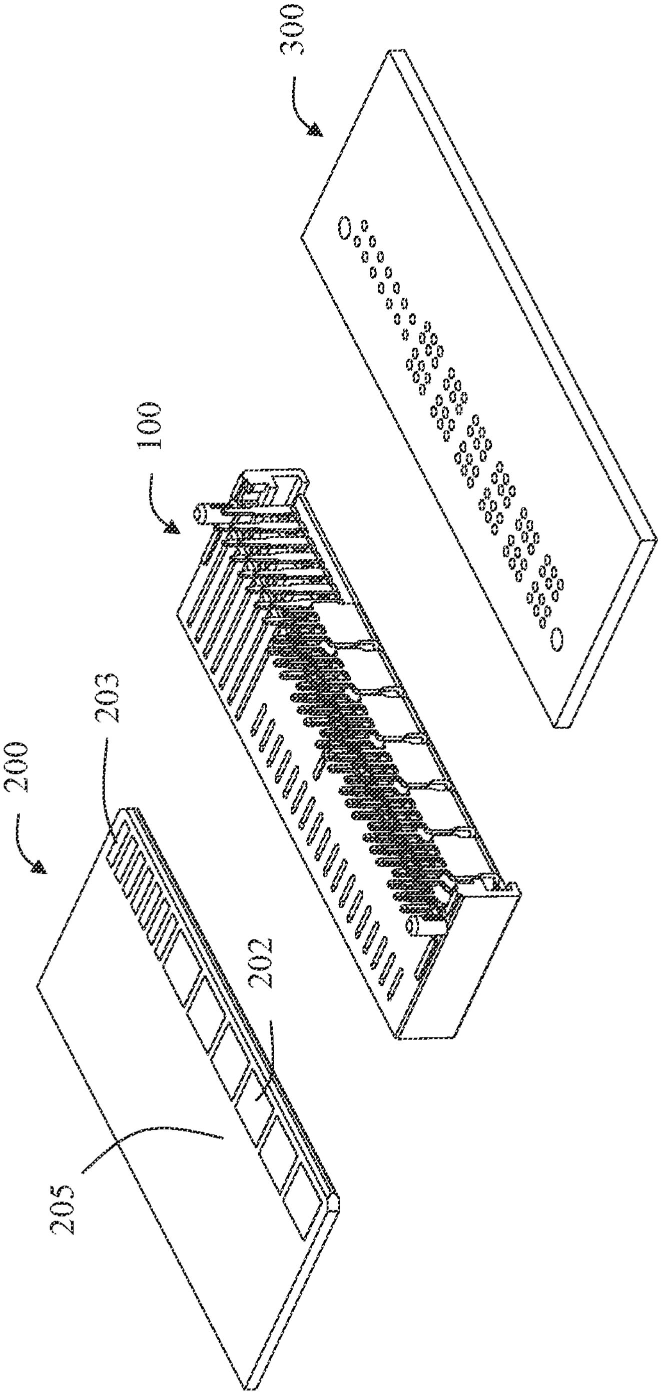
FIG. 4 is a partial perspective exploded view of FIG. 3 from another angle.

Referring to FIG. 2 and FIG. 3, in the illustrated embodiment of the present disclosure, the electrical connector 100 is a card edge connector. Accordingly, the mating module 200 is an electronic card. The mating module 200 includes a plurality of first conductive pads 201, a plurality of second conductive pads 202 and a plurality of third conductive pads 203. The electronic card includes a first surface 204 and a second surface 205 opposite to the first surface 204. In the illustrated embodiment of the present disclosure, the plurality of first conductive pads 201 are located on the first surface 204. The plurality of second conductive pads 202 are located on the second surface 205. The plurality of third conductive pads 203 are located on the first surface 204 and the second surface 205.

Figure 5:
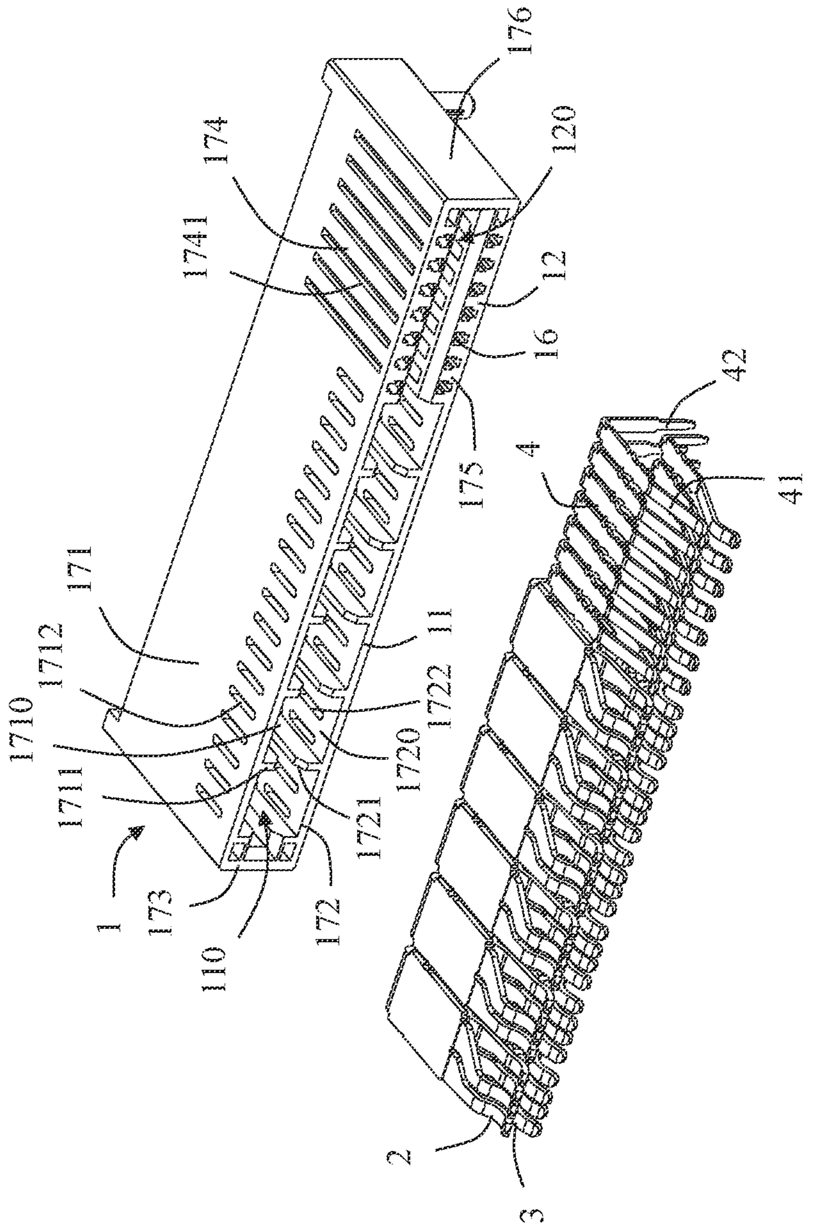
FIG. 5 is a partial perspective exploded view of an electrical connector in FIG. 3.
Figure 6:
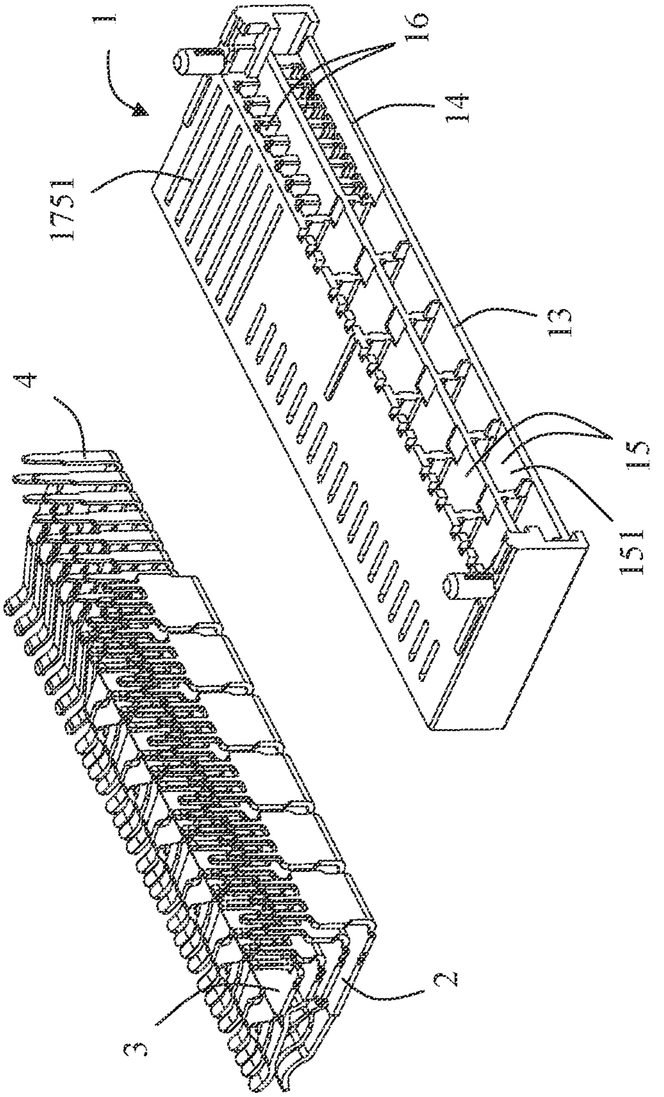
FIG. 6 is a partial perspective exploded view of FIG. 5 from another angle.
Figure 7:
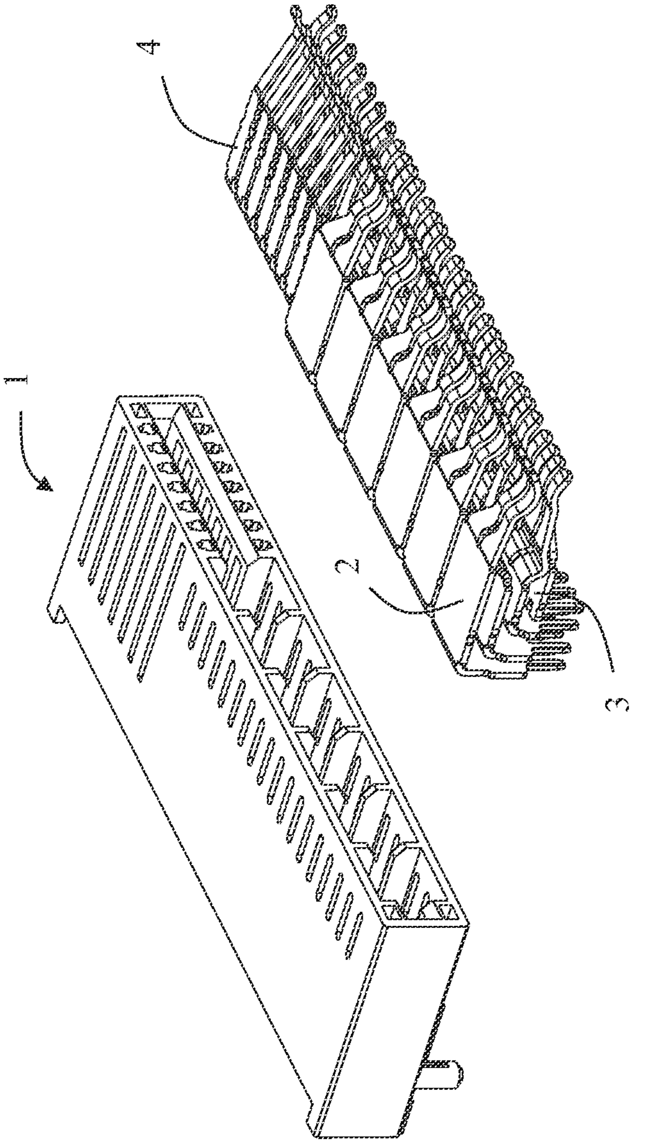
FIG. 7 is a partial perspective exploded view of FIG. 5 from yet another angle.

Referring to FIG. 5 to FIG. 7, the insulating body 1 includes a first mating surface 11, a second mating surface 12, a first mating slot 110 extending through the first mating surface 11, a second mating slot 120 extending through the second mating surface 12, a first installation surface 13 opposite to the first mating surface 11, a second installation surface 14 opposite to the second mating surface 12, a plurality of terminal installation grooves 15 extending through the first installation surface 13, and a plurality of terminal receiving grooves 16 extending through the second installation surface 14. In the illustrated embodiment of the present disclosure, the plurality of terminal installation grooves 15 communicate with the first mating slot 110. The plurality of terminal receiving grooves 16 communicate with the second mating slot 120. The insulating body 1 further includes an abutting surface 151 exposed in the terminal installation grooves 15.

The insulating body 1 includes a first top wall 171, a first bottom wall 172 opposite to the first top wall 171, a first side wall 173 connecting the first top wall 171 and the first bottom wall 172, a second top wall 174 connecting the first top wall 171, a second bottom wall 175 connecting the second bottom wall 172, and a second side wall 176 connecting the second top wall 174 and the second bottom wall 175. In the illustrated embodiment of the present disclosure, the first mating surface 11 is flush with the second mating surface 12. The first mating slot 110 and the second mating slot 120 communicate with each other to jointly receive the mating module 200. The first top wall 171 defines a plurality of first partitions 1711 protruding toward the first bottom wall 172. Each two adjacent first partitions 1711 form a first groove 1710. The first bottom wall 172 defines a plurality of second partitions 1721 protruding toward the first top wall 171. Each two adjacent second partitions 1721 form a second groove 1720. The first grooves 1710 and the second grooves 1720 are aligned with each other. In order to improve heat dissipation, the first top wall 171 is provided with a plurality of first heat dissipation slots 1712 extending through the first top wall 171. The first bottom wall 172 defines a plurality of second heat dissipation slots 1722 extending through the first bottom wall 172.

The plurality of terminal receiving grooves 16 extend through the second mating surface 12 to improve heat dissipation. In addition, the second top wall 174 defines a plurality of third heat dissipation slots 1741 extending through the second top wall 174. The second bottom wall 175 defines a plurality of fourth heat dissipation slots 1751 extending through the second bottom wall 175.

In the illustrated embodiment of the present disclosure, the plurality of first power terminal modules 2 are fixed to the insulating body 1, and all the first power terminal modules 2 have the same structure. The following only takes one first power terminal module 2 as an example for detailed description.

Referring to FIG. 8 to FIG. 13, the first power terminal module 2 includes a first power terminal 21 and a second power terminal 22. The first power terminal 21 includes a first main body portion 211, a first elastic arm 212 integrally extending from the first main body portion 211, and a first tail portion 213 integrally extending from the first main body portion 211. The first elastic arm 212 includes a first mating portion 2121 extending into the first mating slot 110.

The second power terminal 22 includes a second main body portion 221, a second elastic arm 222 integrally extending from the second main body portion 221, and a second tail portion 223 integrally extending from the second main body portion 221. The second elastic arm 222 includes a second mating portion 2221 extending into the first mating slot 110.

The first main body portion 211 and the second main body portion 221 are arranged at intervals along a first direction D1-D1 (for example, a top-bottom direction). The first mating portion 2121 and the second mating portion 2221 are arranged at intervals along a second direction D2-D2 (for example, a left-right direction). The first tail portion 213 and the second tail portion 223 are arranged at intervals along a third direction D3-D3 (for example, a front-rear direction). The first direction D1-D1 is perpendicular to the second direction D2-D2. The third direction D3-D3 is perpendicular to both the first direction D1-D1 and the second direction D2-D2.

The second elastic arm 222 includes a first raised portion 224 protruding toward the first power terminal 21 along the first direction D1-D1. The first raised portion 224 has a first inclined portion 2241, a second inclined portion 2242, and an are portion 2243 connecting the first inclined portion 2241 and the second inclined portion 2242.

Figure 17:
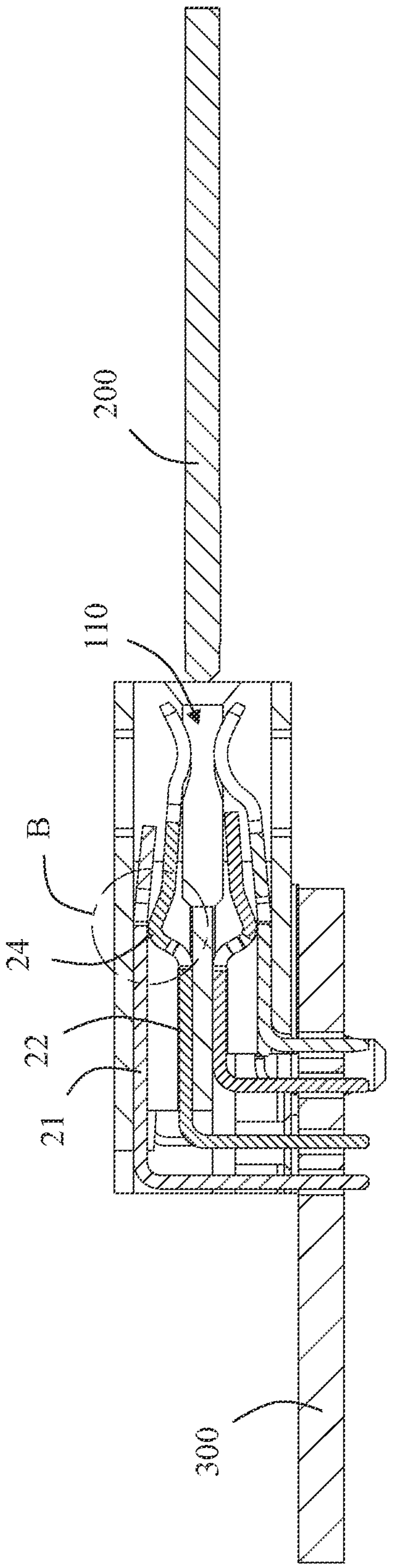
FIG. 17 is a schematic cross-sectional view taken along line A-A in FIG. 1, wherein a mating module is not inserted into the electrical connector.
Figure 19:
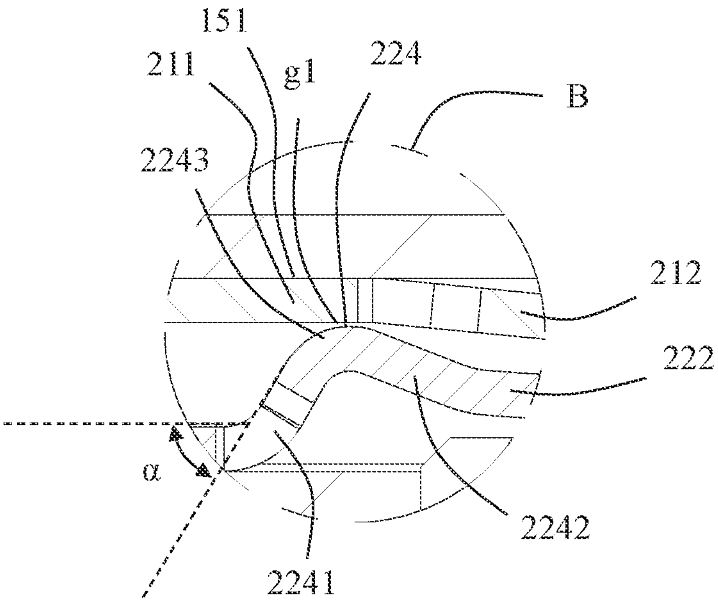
FIG. 19 is a partially enlarged view of a circled portion B in FIG. 17.

Referring to FIG. 17 and FIG. 19, when the mating module 200 is not inserted into the first mating slot 110, a first gap g1 is formed between the first raised portion 224 and the first power terminal 21 in the first direction D1-D1, so that the first raised portion 224 is not in contact with the first power terminal 21.

Figure 18:
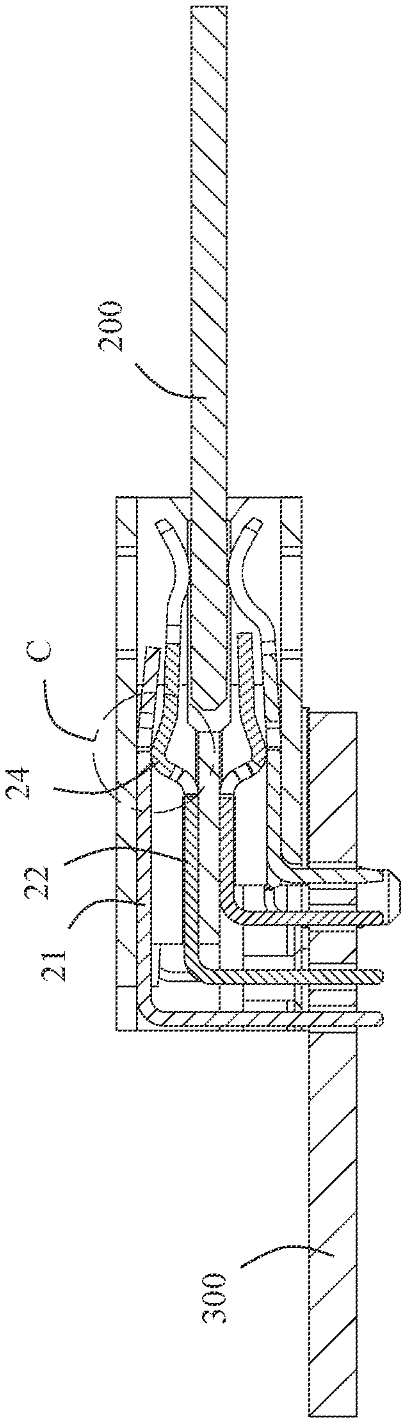
FIG. 18 is a schematic cross-sectional view taken along line A-A in FIG. 1, wherein the mating module is inserted into the electrical connector.
Figure 20:
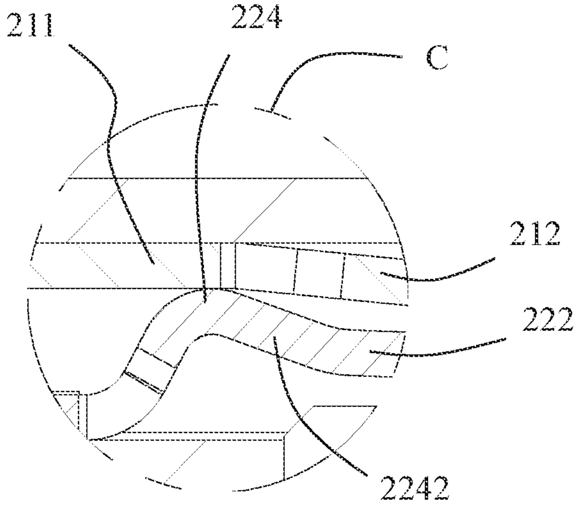
FIG. 20 is a partially enlarged view of a circled portion C in FIG. 18.

Referring to FIG. 18 and FIG. 20, when the mating module 200 is inserted into the first mating slot 110 and inserted in place, the second elastic arm 222 is abutted by the mating module 200 and deformed toward the first power terminal 21, so that the first raised portion 224 is in contact with the first power terminal 21 in the first direction D1-D1.

The first main body portion 211 is L-shaped, and includes a flat first base portion 2111 and a first bent portion 2112 bent from the first base portion 2111. The first elastic arm 212 integrally extends from the first base portion 2111. The first tail portion 213 integrally extends from the first bent portion 2112. In the illustrated embodiment of the present disclosure, an angle R is formed at the connection between the first elastic arm 212 and the first base portion 2111 so as to improve the elasticity of the first elastic arm 212. In the illustrated embodiment of the present disclosure, there are multiple first tail portions 213 of one first power terminal 21 and are arranged at intervals along the second direction D2-D2. The first tail portions 213 are used for being connected to the circuit board 300. In the illustrated embodiment of the present disclosure, when the mating module 200 is inserted into the first mating slot 110 and inserted in place, the first raised portion 224 abuts against the first base portion 2111. After the first power terminal 21 is installed in the corresponding terminal installation groove 15, the abutting surface 151 is at least engaged with a part of the first main body portion 211. With such arrangement, when the mating module 200 is inserted, the insulating body 1 can abut against and limit the first power terminal 21 to prevent the first power terminal 21 from warping improperly (for example prevent the see-saw phenomenon).

Figure 8:
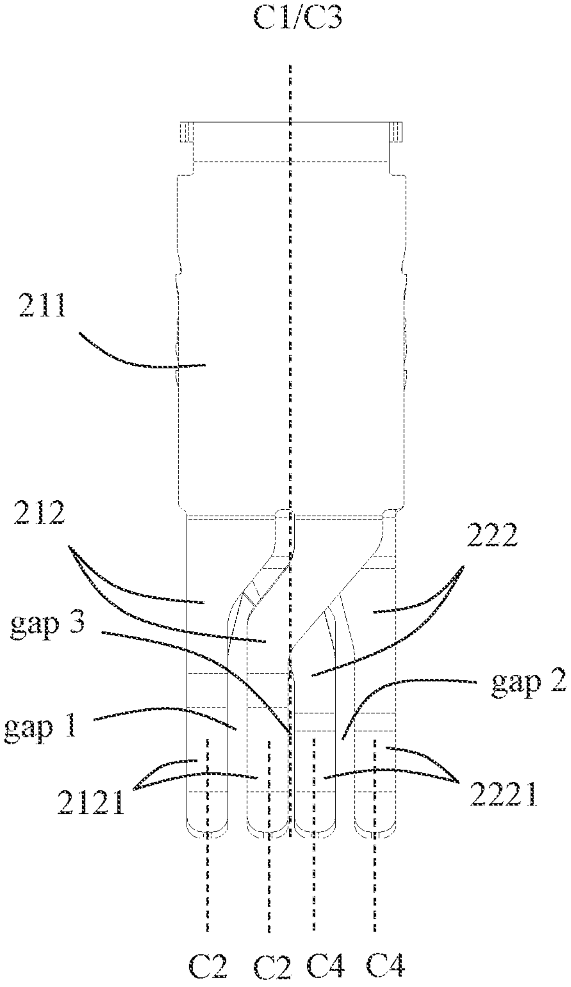
FIG. 8 is a top view of a first power terminal module in FIG. 5.

As shown in FIG. 8, in the first embodiment of the first power terminal module 2 of the present disclosure, there are two first elastic arms 212 of the first power terminal 21, and the two first elastic arms 212 are arranged at intervals along the second direction D2-D2. A first distance gap 1 is provided between the two first elastic arms 212. The first base portion 2111 has a first centerline C1. The first abutting portion 2121 has a second centerline C2. The first centerline C1 and the second centerline C2 are misaligned.

The second main body portion 221 is L-shaped, and includes a flat second base portion 2211 and a second bent portion 2212 bent from the second base portion 2211. The second elastic arm 222 integrally extends from the second base portion 2211. The second tail portion 223 integrally extends from the second bent portion 2212. In the illustrated embodiment of the present disclosure, there are multiple second tail portions 223 of one second power terminal 22 and arranged at intervals along the second direction D2-D2. The second tail portions 223 are used for being connected the circuit board 300. In the illustrated embodiment of the present disclosure, an angle between the first inclined portion 2241 and the second base portion 2221 is α, where 0°<α≤65°. With such arrangement, it is beneficial to maintain the elasticity of the second elastic arm 222 and avoid yielding (that is, losing good elasticity).

In the first embodiment of the first power terminal module 2 of the present disclosure, there are two second elastic arms 222 of the second power terminal 22. The two second elastic arms 222 are arranged at intervals along the second direction D2-D2. A second distance gap 2 is provided between the two second elastic arms 222. A distance between the two first elastic arms 212 and the two second elastic arms 222 is a third distance gap 3. The first distance gap 1 is the same as the second distance gap 2 and both are greater than the third distance gap 3. The second base portion 2211 has a third centerline C3. The second abutting portion 2221 has a fourth centerline C4. The third centerline C3 and the fourth centerline C4 are misaligned.

In the illustrated embodiment of the present disclosure, both the first elastic arm 212 and the second elastic arm 222 have a structure with a root portion and a free end narrower than the root portion. With such arrangement, it is beneficial to achieve a balance between maintaining flexibility and maintaining a terminal area as large as possible.

Figure 9:
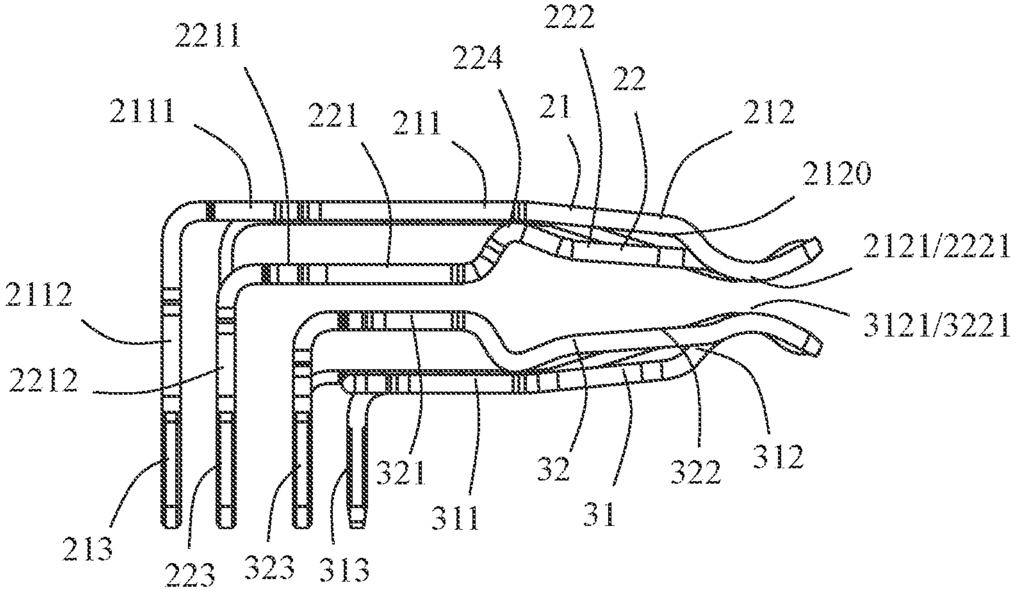
FIG. 9 is a left view of conductive terminals in FIG. 7.
Figure 10:
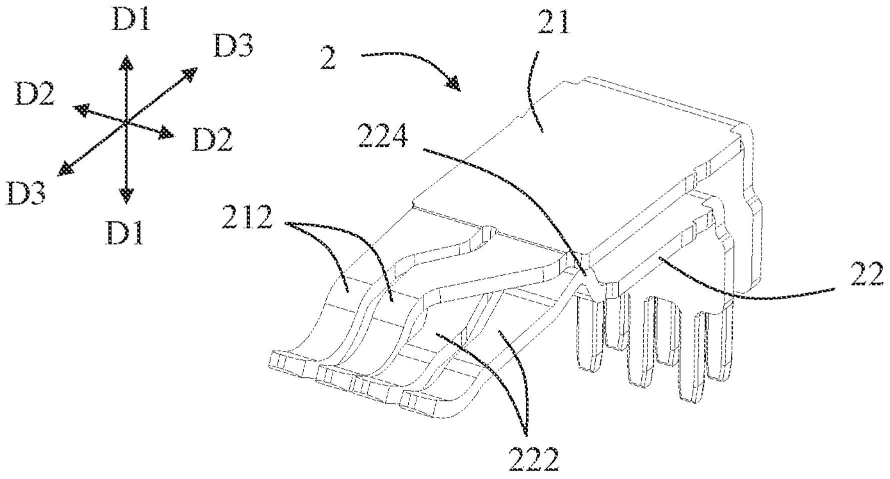
FIG. 10 is a schematic perspective view of a first power terminal module in FIG. 5.
Figure 11:
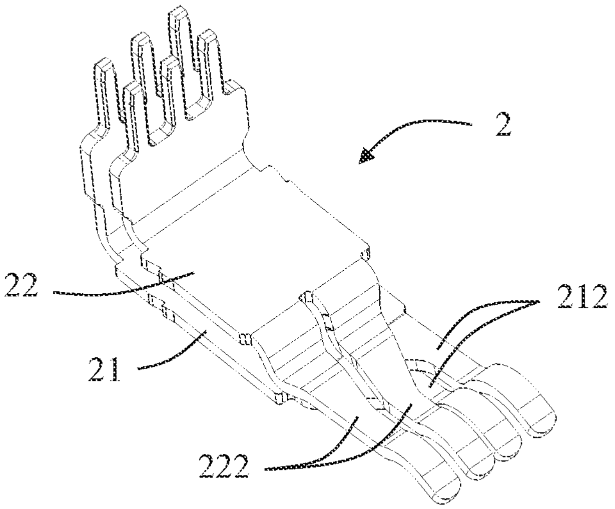
FIG. 11 is a schematic perspective view of FIG. 10 from another angle.
Figure 12:
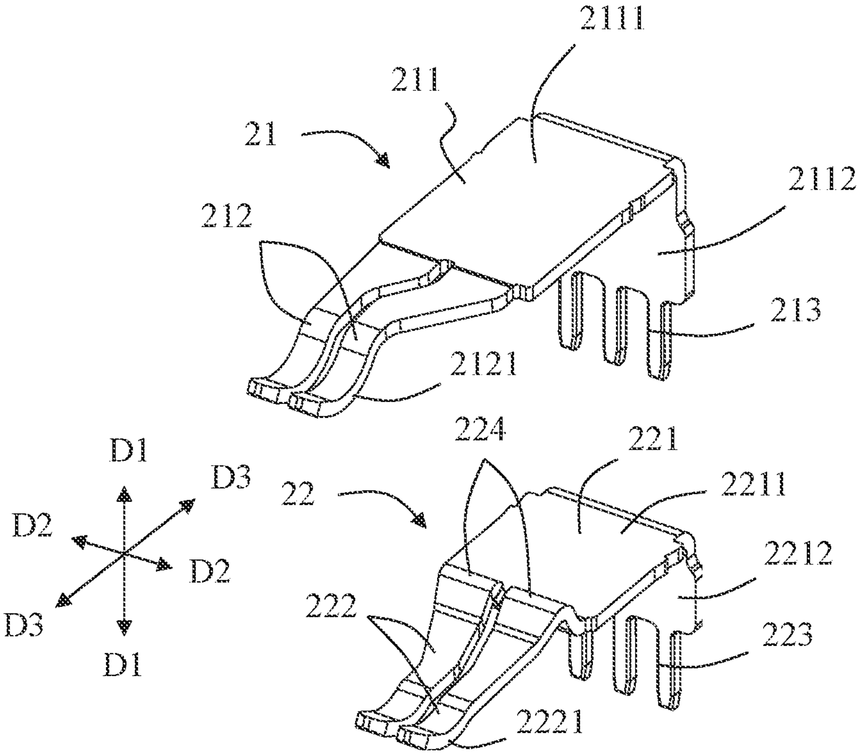
FIG. 12 is a perspective exploded view of the first power terminal module.
Figure 13:
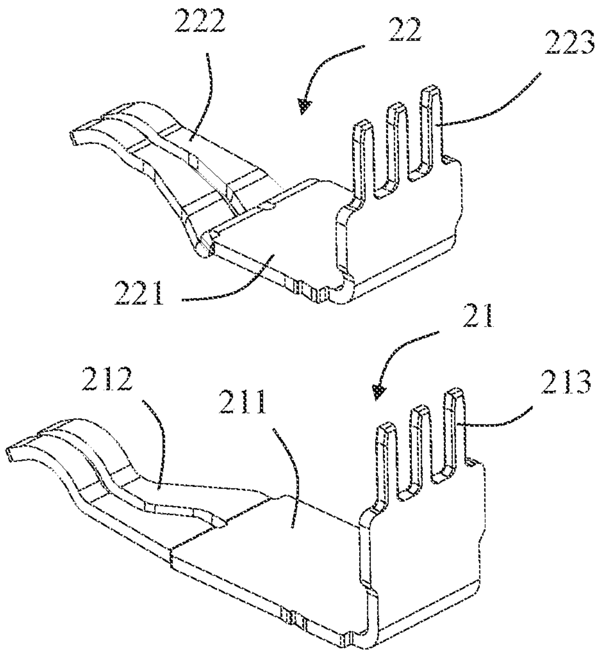
FIG. 13 is a perspective exploded view of FIG. 12 from another angle.

Referring to FIG. 9, in the embodiment shown in the present disclosure, the first power terminal module 2 includes a space 2120 located between the first elastic arm 212 and the second elastic arm 222 along the first direction D1-D1. In this way, mutual interference between the first elastic arm 212 and the second elastic arm 222 is avoided.

In the illustrated embodiment of the present disclosure, both the first mating portion 2121 and the second mating portion 2221 are arc-shaped. Protruding directions of the first abutting portion 2121 and the second abutting portion 2221 are the same, and both are opposite to a protruding direction of the first raised portion 224. The first mating portion 2121 and the second mating portion 2221 are located at the same height.

The second power terminal module 3 includes a third power terminal 31 and a fourth power terminal 32. The third power terminal 31 includes a third main body 311, a third elastic arm 312 integrally extending from the third main body portion 311, and a third tail portion 313 integrally extending from the third main portion 311. The third elastic arm 312 includes a third mating portion 3121 extending into the first mating slot 110.

The fourth power terminal 32 includes a fourth main body 321, a fourth elastic arm 322 integrally extending from the fourth main body portion 321, and a fourth tail portion 323 integrally extending from the fourth main portion 321. The fourth elastic arm 322 includes a fourth mating portion 3221 extending into the first mating slot 110.

The third main body portion 311 and the fourth main body portion 321 are arranged at intervals along the first direction D1-D1 (for example, the top-bottom direction). The third mating portion 3121 and the fourth mating portion 3221 are arranged at intervals along the second direction D2-D2 (for example, the left-right direction). The third tail portion 313 and the fourth tail portion 323 are arranged at intervals along the third direction D3-D3 (for example, the front-rear direction).

The fourth elastic arm 322 has a second raised portion 324 protruding toward the third power terminal 31 along the first direction D1-D1.

When the mating module 200 is not inserted into the first mating slot 110, there is a second gap (referring to the first gap g1) between the second raised portion 324 and the third power terminal 31 in the first direction D1-D1, so that the second raised portion 324 is not in contact with the third power terminal 31.

When the mating module 200 is inserted into the first mating slot 110 and inserted in place, the fourth elastic arm 322 is abutted by the mating module 200 and deformed toward the third power terminal 31, so that the second raised portion 324 is in contact with the third power terminal 31 in the first direction D1-D1.

In the illustrated embodiment of the present disclosure, the first body portion 211, the second body portion 221, the fourth body portion 321 and the third body portion 311 are sequentially arranged at intervals along the first direction D1-D1. The first tail portion 213, the second tail portion 223, the fourth tail portion 323 and the third tail portion 313 are sequentially arranged at intervals along the third direction D3-D3. A partial structure of the first elastic arm 212 and the third elastic arm 312 are symmetrically disposed on two sides of the first mating slot 110. A partial structure of the second elastic arm 222 and the fourth elastic arm 322 are symmetrically disposed on the two sides of the first mating slot 110.

Referring to FIG. 4 to FIG. 7, the plurality of conductive terminals 4 are installed and fixed in the plurality of terminal receiving grooves 16. Each conductive terminal 4 includes an elastic contact portion 41 extending into the second mating slot 120 and a tail portion 42 extending beyond the insulating body 1. The tail portion 42 is used for being mounted to the circuit board 300. In the illustrated embodiment of the present disclosure, the elastic contact portions 41 of the plurality of conductive terminals 4 are arranged in two rows, and are arranged on two sides (for example, upper and lower sides) of the second mating slot 120. The elastic contact portions 41 are configured to be in contact with the third conductive pads 203 of the mating module 200. According to different application requirements, the plurality of conductive terminals 4 may be power terminals and/or signal terminals.

Figure 14:
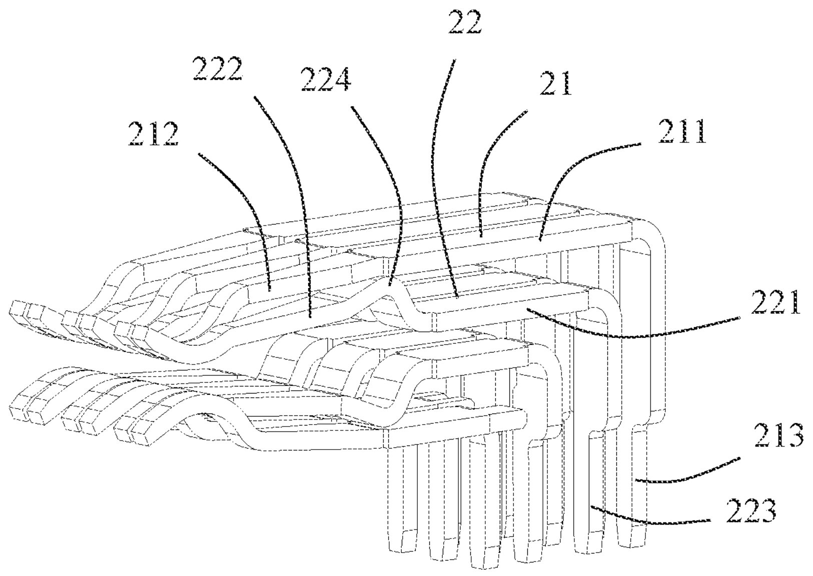
FIG. 14 is a schematic perspective view of the first power terminal module in accordance with another embodiment of the present disclosure.
Figure 15:
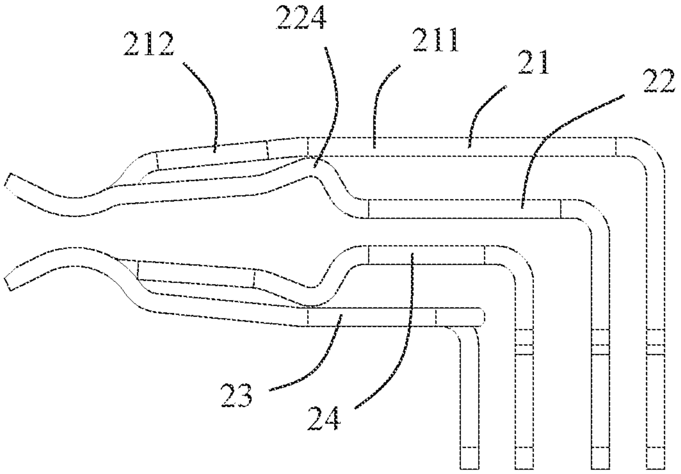
FIG. 15 is a right view of FIG. 14.
Figure 16:
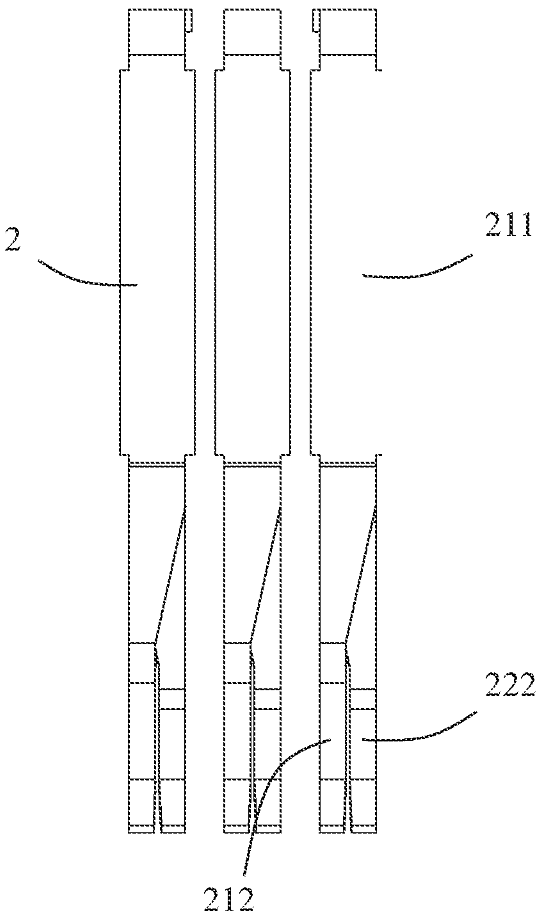
FIG. 16 is a top view of FIG. 14.

Referring to FIG. 14 to FIG. 16, in a second embodiment of the first power terminal module 2 of the present disclosure, the first power terminal 21 has only one first elastic arm 212, and the second power terminal 22 also has only one second elastic arm 212.

Compared with the prior art, the second elastic arm 222 of the present disclosure is provided with the first raised portion 224 protruding toward the first power terminal 21 along the first direction D1-D1. When the mating module 200 is not inserted into the first mating slot 110, the first raised portion 224 and the first power terminal 21 have the first gap g1 in the first direction D1-D1. Therefore, the first raised portion 224 is not in contact with the first power terminal 21, so that a relatively weak plugging feel is produced. In other words, when the mating module 200 is just inserted, the plugging force is relatively small, which facilitates the insertion of the mating module 200. When the mating module 200 is further inserted into the first mating slot 110 and inserted in place, the second elastic arm 222 is abutted by the mating module 200 and deformed toward the first power terminal 21. As a result, the first raised portion 224 is made to contact the first power terminal 21 in the first direction D1-D1, so as to generate a relatively strong plugging feel. In other words, when the mating module 200 is further inserted, the plugging force is greater, thereby improving the contact reliability between the mating module 200 and the power terminals. At the same time, through the first raised portion 224 abutting against the first power terminal 21, the first power terminal 21 and the second power terminal 22 are connected in series, which facilitates the transmission of relatively large current.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a first mating surface and a first mating slot extending through the first mating surface, the first mating slot being configured to receive a mating module; and a first power terminal module fixed to the insulating body, the first power terminal module comprising a first power terminal and a second power terminal, the first power terminal comprising a first main body portion, a first elastic arm extending from the first main body portion, and a first tail portion extending from the first main body portion; the first elastic arm comprising a first mating portion extending into the first mating slot; the second power terminal comprising a second main body portion, a second elastic arm extending from the second main body portion, and a second tail portion extending from the second main body portion; the second elastic arm comprising a second mating portion extending into the first mating slot; the first main body portion and the second main body portion being arranged at intervals along a first direction; the first mating portion and the second mating portion being arranged at intervals along a second direction perpendicular to the first direction;

wherein the second elastic arm is provided with a first raised portion protruding toward the first power terminal along the first direction;

when the mating module is not inserted into the first mating slot, a first gap is formed between the first raised portion and the first power terminal in the first direction, so that the first raised portion is not in contact with the first power terminal; and when the mating module is inserted into the first mating slot and inserted in place, the second elastic arm is deformed toward the first power terminal by being abutted by the mating module, so that the first raised portion is in contact with the first power terminal in the first direction.

2. The electrical connector according to claim 1, wherein both the first mating portion and the second mating portion are arc-shaped; protruding directions of the first abutting portion and the second abutting portion are the same, and are opposite to a protruding direction of the first raised portion.

3. The electrical connector according to claim 1, wherein the first tail portion and the second tail portion are arranged at intervals along a third direction which is perpendicular to the first direction and the second direction.

4. The electrical connector according to claim 1, wherein the first body portion comprises a first base portion from which the first elastic arm integrally extends; the first base portion has a first centerline; the first mating portion has a second centerline; and the first centerline and the second centerline are misaligned; and wherein the second main body portion comprises a second base portion from which the second elastic arm integrally extends; the second base portion has a third centerline; the second mating portion has a fourth centerline; and the third centerline and the fourth centerline are misaligned.

5. The electrical connector according to claim 1, wherein the first power terminal module comprises a space disposed between the first elastic arm and the second elastic arm along the first direction.

6. The electrical connector according to claim 1, wherein the first mating portion and the second mating portion are located at a same height.

7. The electrical connector according to claim 1, wherein the first main body portion comprises a first base portion and a first bent portion bent from the first base portion, the first elastic arm integrally extends from the first base portion, and the first tail portion integrally extends from the first bent portion; and wherein the second main body portion comprises a second base portion and a second bent portion bent from the second base portion, the second elastic arm integrally extends from the second base portion, and the second tail portion integrally extends from the second bent portion;

when the mating module is inserted into the first mating slot and inserted in place, the first raised portion abuts against the first base portion.

8. The electrical connector according to claim 1, wherein the first body portion comprises a first base portion from which the first elastic arm integrally extends;

the second main body portion comprises a second base portion from which the second elastic arm integrally extends;

the first raised portion has a first inclined portion and a second inclined portion, an included angle $\alpha$ is formed between the first inclined portion and the second base portion, where $0° < \alpha \leq 65°$.

9. The electrical connector according to claim 1, wherein the insulating body comprises a first installation surface opposite to the first mating surface, a plurality of terminal installation grooves extending through the first installation surface, and an abutting surface exposed in the plurality of terminal installation grooves; the plurality of terminal installation grooves communicate with the first mating slot; and the abutting surface is at least engaged with part of the first main body portion.

10. The electrical connector according to claim 1, wherein the first elastic arm and the second elastic arm both have a root portion and a free end which is narrower than the root portion.

11. A card edge connector configured to receive an electronic card, comprising:

an insulating body comprising a first mating surface and a first mating slot extending through the first mating surface, the first mating slot being configured to receive the electronic card; and a first power terminal module comprising a first power terminal and a second power terminal, the first power terminal comprising a first main body portion, a first elastic arm and a first tail portion; the first elastic arm comprising a first mating portion extending into the first mating slot; the second power terminal comprising a second main body portion, a second elastic arm and a second tail portion; the second elastic arm comprising a second mating portion extending into the first mating slot; the first main body portion and the second main body portion being arranged at intervals along a first direction; the first mating portion and the second mating portion being arranged at intervals along a second direction perpendicular to the first direction;

wherein the second elastic arm is provided with a first raised portion protruding toward the first power terminal;

when the electronic card is not inserted into the first mating slot, a first gap is formed between the first raised portion and the first power terminal in the first direction, so that the first raised portion is not in contact with the first power terminal; and when the electronic card is inserted into the first mating slot and inserted in place, the second elastic arm is driven by the electronic card, so that the first raised portion is in contact with the first power terminal in the first direction.

12. The card edge connector according to claim 11, wherein both the first mating portion and the second mating portion are arc-shaped; protruding directions of the first abutting portion and the second abutting portion are the same, and are opposite to a protruding direction of the first raised portion.

13. The card edge connector according to claim 11, wherein the first tail portion and the second tail portion are arranged at intervals along a third direction which is perpendicular to the first direction and the second direction.

14. The card edge connector according to claim 11, wherein the first body portion comprises a first base portion from which the first elastic arm integrally extends; the first base portion has a first centerline; the first mating portion has a second centerline; and the first centerline and the second centerline are misaligned; and wherein the second main body portion comprises a second base portion from which the second elastic arm integrally extends; the second base portion has a third centerline; the second mating portion has a fourth centerline; and the third centerline and the fourth centerline are misaligned.

15. The card edge connector according to claim 11, wherein the first power terminal module comprises a space disposed between the first elastic arm and the second elastic arm along the first direction.

16. The card edge connector according to claim 11, wherein the first mating portion and the second mating portion are located at a same height.

17. The card edge connector according to claim 11, wherein the first main body portion comprises a first base portion and a first bent portion bent from the first base portion, the first elastic arm integrally extends from the first base portion, and the first tail portion integrally extends from the first bent portion; and wherein the second main body portion comprises a second base portion and a second bent portion bent from the second base portion, the second elastic arm integrally extends from the second base portion, and the second tail portion integrally extends from the second bent portion;

when the electronic card is inserted into the first mating slot and inserted in place, the first raised portion abuts against the first base portion.

18. The card edge connector according to claim 11, wherein the first body portion comprises a first base portion from which the first elastic arm integrally extends:

the second main body portion comprises a second base portion from which the second elastic arm integrally extends;

the first raised portion has a first inclined portion and a second inclined portion, an included angle $\alpha$ is formed between the first inclined portion and the second base portion, where $0° < \alpha \leq 65°$.

19. The card edge connector according to claim 11, wherein the insulating body comprises a first installation surface opposite to the first mating surface, a plurality of terminal installation grooves extending through the first installation surface, and an abutting surface exposed in the plurality of terminal installation grooves; the plurality of terminal installation grooves communicate with the first mating slot; and the abutting surface is at least engaged with part of the first main body portion.

20. The card edge connector according to claim 11, wherein the first elastic arm and the second elastic arm both have a root portion and a free end which is narrower than the root portion.

* * * * *